US008607093B2

(12) United States Patent
DeHaan et al.

(10) Patent No.: US 8,607,093 B2
(45) Date of Patent: Dec. 10, 2013

(54) SYSTEMS AND METHODS FOR DETECTING MACHINE FAULTS IN NETWORK USING ACOUSTIC MONITORING

(75) Inventors: Michael Paul DeHaan, Morrisville, NC (US); Adrian Karstan Likins, Raleigh, NC (US); Seth Kelby Vidal, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 160 days.

(21) Appl. No.: 12/551,418

(22) Filed: Aug. 31, 2009

(65) Prior Publication Data
US 2011/0055669 A1  Mar. 3, 2011

(51) Int. Cl.
*G06F 11/00* (2006.01)
(52) U.S. Cl.
USPC ............... 714/25; 714/39; 702/39; 702/77
(58) Field of Classification Search
None
See application file for complete search history.

(56) References Cited

U.S. PATENT DOCUMENTS

| | | | | |
|---|---|---|---|---|
| 5,521,840 A * | 5/1996 | Bednar | ............. | 702/183 |
| 6,154,128 A | 11/2000 | Wookey et al. | | |
| 6,173,074 B1 * | 1/2001 | Russo | ............. | 382/190 |
| 6,263,455 B1 | 7/2001 | Bannister | | |
| 6,327,677 B1 | 12/2001 | Garg et al. | | |
| 6,529,784 B1 | 3/2003 | Cantos et al. | | |
| 6,581,466 B1 * | 6/2003 | Costley et al. | ............. | 73/584 |
| 6,611,869 B1 | 8/2003 | Eschelbeck et al. | | |
| 6,636,521 B1 | 10/2003 | Giulianelli | | |
| 6,721,880 B1 | 4/2004 | Pike | | |
| 6,915,457 B1 | 7/2005 | Miller | | |
| RE39,717 E | 7/2007 | Yates et al. | | |
| 7,373,553 B2 | 5/2008 | Tripp et al. | | |
| 7,441,021 B1 | 10/2008 | Perry | | |
| 7,660,824 B2 | 2/2010 | Halpern et al. | | |
| 7,693,966 B2 | 4/2010 | Schmid | | |
| 7,769,990 B1 | 8/2010 | Okcu et al. | | |
| 7,856,496 B2 | 12/2010 | Kline | | |
| 7,865,578 B1 | 1/2011 | Gerraty | | |
| 2002/0184349 A1 | 12/2002 | Manukyan | | |
| 2003/0055931 A1 | 3/2003 | Cravo De Almeida et al. | | |
| 2003/0061323 A1 | 3/2003 | East et al. | | |
| 2003/0120754 A1 | 6/2003 | Muto et al. | | |
| 2003/0177412 A1 | 9/2003 | Todd | | |
| 2003/0208589 A1 | 11/2003 | Yamamoto | | |
| 2004/0006546 A1 | 1/2004 | Wedlake et al. | | |
| 2004/0032625 A1 | 2/2004 | Yamano | | |
| 2004/0034577 A1 | 2/2004 | Van Hoose et al. | | |
| 2004/0112136 A1 * | 6/2004 | Terry et al. | ............. | 73/572 |
| 2004/0198319 A1 | 10/2004 | Whelan et al. | | |
| 2004/0230828 A1 | 11/2004 | DeFuria et al. | | |

(Continued)

*Primary Examiner* — Kamini Patel
*Assistant Examiner* — Jason Bryan
(74) *Attorney, Agent, or Firm* — Lowenstein Sandler LLP

(57) ABSTRACT

Embodiments relate systems and methods for detecting machine faults in a network using acoustic monitoring. In embodiments, one or more servers, clients, or other machines in a managed network can have a microphone or other acoustic sensor integrated into motherboard or other hardware. The sensor can sample acoustic signals from inside or near the machine, and can digitize that data. The resulting set of acoustic data can be transmitted to a management server or other destination for analysis of the operating sounds related to that machine. For instance, the acoustic data can be analyzed to detect indications of a failed or failing hard drive, for instance by detecting spindle whine or head movement noises, or a failed or failing power supply based on other sounds. The management server can respond to potential fault events for instance by issuing configuration commands, such as instructions to power down the malfunctioning component.

33 Claims, 4 Drawing Sheets

(56) References Cited

U.S. PATENT DOCUMENTS

| | | |
|---|---|---|
| 2005/0066218 A1* | 3/2005 | Stachura et al. ............... 714/3 |
| 2005/0198196 A1 | 9/2005 | Bohn et al. |
| 2006/0004806 A1 | 1/2006 | Kraft |
| 2006/0031188 A1 | 2/2006 | Lara et al. |
| 2006/0050862 A1 | 3/2006 | Shen et al. |
| 2006/0075294 A1 | 4/2006 | Ma et al. |
| 2006/0161444 A1 | 7/2006 | Lubrecht et al. |
| 2007/0005661 A1 | 1/2007 | Yang |
| 2007/0027936 A1 | 2/2007 | Stakutis et al. |
| 2007/0038679 A1 | 2/2007 | Ramkumar et al. |
| 2007/0074077 A1* | 3/2007 | Markow et al. ............... 714/36 |
| 2007/0121527 A1 | 5/2007 | Zhou et al. |
| 2007/0266124 A1 | 11/2007 | Kinyon et al. |
| 2007/0288530 A1 | 12/2007 | Romem et al. |
| 2008/0016186 A1 | 1/2008 | Ball |
| 2008/0091466 A1 | 4/2008 | Butler et al. |
| 2008/0209033 A1 | 8/2008 | Ginter et al. |
| 2008/0219563 A1 | 9/2008 | Moroney |
| 2008/0244047 A1 | 10/2008 | Yeung et al. |
| 2009/0070442 A1 | 3/2009 | Kacin et al. |
| 2009/0132698 A1 | 5/2009 | Barnhill, Jr. |
| 2009/0193413 A1 | 7/2009 | Lee |
| 2009/0276620 A1 | 11/2009 | McCarron et al. |
| 2009/0276772 A1 | 11/2009 | Garrett et al. |
| 2009/0300180 A1 | 12/2009 | DeHaan et al. |
| 2010/0077076 A1 | 3/2010 | Wada |
| 2010/0088197 A1 | 4/2010 | DeHaan |
| 2010/0131625 A1 | 5/2010 | DeHaan |
| 2010/0185590 A1 | 7/2010 | D'Angelo et al. |
| 2010/0198964 A1 | 8/2010 | Tanaka |
| 2010/0218014 A1 | 8/2010 | Bozek et al. |
| 2010/0223274 A1 | 9/2010 | DeHaan |
| 2010/0223375 A1 | 9/2010 | DeHaan |
| 2010/0275064 A1 | 10/2010 | DeCusatis et al. |
| 2010/0306334 A1 | 12/2010 | DeHaan |
| 2010/0306347 A1 | 12/2010 | DeHaan |
| 2010/0306359 A1 | 12/2010 | DeHaan |
| 2011/0047414 A1 | 2/2011 | Kudo et al. |
| 2011/0055361 A1 | 3/2011 | DeHaan |
| 2011/0055636 A1 | 3/2011 | DeHaan |
| 2011/0055810 A1 | 3/2011 | DeHaan |
| 2011/0078301 A1 | 3/2011 | DeHaan |
| 2011/0107299 A1 | 5/2011 | DeHaan |

* cited by examiner

SYSTEMS AND METHODS FOR DETECTING MACHINE FAULTS IN NETWORK USING ACOUSTIC MONITORING

FIELD

The present teachings relate to systems and methods for detecting machine faults in a network using acoustic monitoring, and more particularly to platforms and techniques for detecting potential fault conditions, such as failed or failing hard drives or other components, in networked machines by monitoring ambient sounds in those machines.

BACKGROUND OF RELATED ART

Environmental monitoring of network machines is known. The motherboards of servers, clients, and other machines, for instance, can be equipped with temperature sensors to detect various conditions in the respective device, such as an overheating condition in a processor, memory, and so forth. In environmental monitoring applications to date, one factor that has not been made available for detection and monitoring is the acoustic conditions in or around a given machine. In instances, the failure or beginning of failure of a given component may be accompanied by characteristic sounds. In the case of hard disk drives, for instance, a failed or failing bearing may be accompanied by an increased whining or grinding sound, or a disk that is operating incorrectly due to electronics failure may emit head movement or "thrashing" sounds to an excessive degree. Similarly, a failed or failing power supply may emit power line hum or other anomalous noises or sounds. It may be the case in some instances that the first or only indication of a failed or failing part or computer may be the characteristic sounds emitted as the malfunction occurs, but if the machine is remote or no human operator is otherwise nearby, these warning signs may not be detected. It may be desirable to provide systems and methods for detecting machine faults in a network using acoustic monitoring, in which various potential failures, faults, and/or other conditions can be promptly identified by detecting characteristic acoustic signatures.

DESCRIPTION OF THE DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Embodiments of the present teachings relate to systems and methods for detecting machine faults in a network using acoustic monitoring. More particularly, embodiments related to platforms and techniques for the automatic sensing of sound, noise, or other acoustic data in or near a subject machine, digitizing those signals and transmitting them to a management server. In aspects, one or more network machines can have embedded or associated sensors, such as one or more microphones, to detect ambient sound in or near the machine. The network machines can digitize and transmit those signals to a remote management server. The management server can host a monitoring tool configured to receive continuous, periodic, and/or irregular streams of acoustic data associated with a server, client, and/or other machine or node, and subject that acoustic data to analysis to detect potential faults, failures, and/or other conditions. In embodiments, acoustic detection of fault events can in addition or instead take place on the managed machine itself, with an alert or notification of the fault being transmitted to the management server.

In aspects, the monitoring tool can be configured to receive the incoming sets of acoustic data, and subject that data to analysis, such as spectral analysis using a Fourier analysis or other processing to determine constituent frequencies of the sampled acoustic data. In embodiments, the monitoring tool can compare the monitored acoustic data, including spectral representations as appropriate, against a recognition file containing a set of spectral profiles or other acoustic data that can be associated with malfunction components or other anomalous conditions in a machine or the network. For example, a failed or failing hard disk can exhibit an increased amount of high frequency noise due to bearing whine or other conditions, and the monitoring tool can determine a match between the characteristic signature of the malfunctioning component stored in the recognition file and the sampled acoustic data of one or more machines. The monitoring tool can thereby flag or identify an actual or potential failure. In embodiments, the management server hosting the monitoring tool can respond to detected faults by generating configuration commands to attempt to remedy or react to those faults, such as instructions to park or turn off a failed or failing drive. Other types of faults and corresponding remedies can be detected and deployed.

Reference will now be made in detail to exemplary embodiments of the present teachings, which are illustrated in the accompanying drawings. Where possible the same reference numbers will be used throughout the drawings to refer to the same or like parts.

Figure 1:
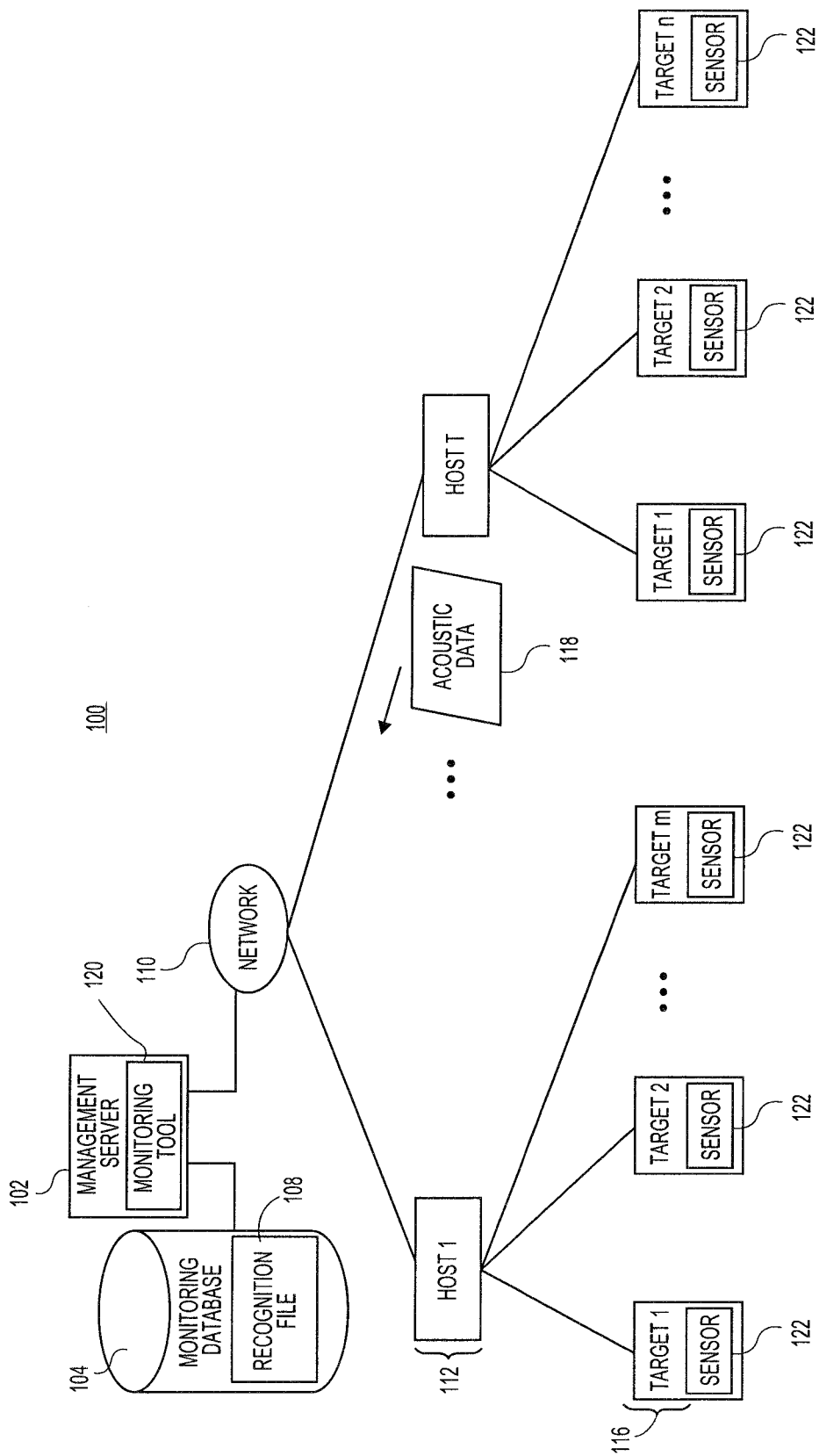
FIG. 1 illustrates an overall network in which systems and methods for detecting machine faults in network using acoustic monitoring can be implemented, according to various embodiments.

FIG. 1 illustrates an overall network 100 in which systems and methods for detecting machine faults in network using acoustic monitoring can be implemented, according to various embodiments of the present teachings. In embodiments as shown, a management server 102 can communicate with a managed network 110 to carry out various detection, network management, deployment, maintenance, or other services. In embodiments, management server 102 can communicate with managed network 110 via secure or non-secure channels or connections, including, for instance, the Internet or other public or private networks. In embodiments, management server 102 can host, maintain, or communicate with a set of associated resources including a monitoring database 104, which can be or include a local or remote database or data store hosting information related to a set of hosts 112, a set of target machines 116, and/or other machines or nodes hosted in managed network 110. In embodiments, management server 102 can comprise, host, or access a monitoring tool 120 containing applications, logic, and/or other resources to receive, filter, analyze, store, and manage data related to the monitoring of machines in managed network 110, including set of hosts 112 and set of target machines 116, using acoustic data 118 captured from those subject machines.

Managed network 110 can include or host a set of resources including set of hosts 112, a set of targets 116, and/or other nodes, machines, or resources. In embodiments, set of hosts 112, set of targets 116, and/or other nodes or resources of managed network 110 can be or include virtual machines, as well as hardware-based or hardware-implemented machines. In embodiments, set of hosts 112, set of targets 116 and/or other resources of managed network 110 can be or include resources instantiated from or based on cloud-based networks. Set of hosts 112, set of targets 116, and/or other nodes or machines can be or include, for example, server machines, client machines, portable computing devices, wireless communication devices, and/or other clients, machines, or devices.

More particularly, in terms of acoustic monitoring, and as shown in FIG. 1, monitoring tool 120 hosted in management server 102 can be configured to receive a set of acoustic data 118 from one or more machines in managed network 110, including from any one or more machines in set of hosts 112, set of targets 116, and/or other machines or nodes. Each machine transmitting acoustic data 118 to management server 102 can be configured with one or more sensor 122, such as an integrated, onboard, or associated microphone or other acoustic or other sensing device. In aspects, sound signals captured via sensor 122 in each machine can be converted to digital samples, for instance using an analog-to-digital converter (ADC) chip, or other hardware of software. Each machine reporting or streaming acoustic data 118 to management server 102 can transmit that data on a continuous, periodic, event-triggered, and/or other regular or irregular basis. In embodiments, acoustic data 118 can be transmitted from a source machine via a wired network connection, and/or a wireless network connection such as a WiFi™ or Bluetooth™ wireless connection.

Monitoring tool 120 can collect acoustic data 118 form various source machines in managed network 110, and can store that data to monitoring database 104 or other data store. Monitoring tool 120 can likewise access a recognition file 106 stored in monitoring database 104. Recognition file 106 can store sonic signatures of various failure, fault, or other conditions that may occur in managed network 112. For example, recognition file 106 can store sounds or signatures associated with a failed or failing hard drive or other disk, such as high frequency pitches caused by defective bearings, thrashing sounds caused by excessive disk caching, clicking sounds cause by a defective drive head, and/or other sounds, noises, or acoustic events. Recognition file 106 can store other sounds, noises, or signatures, such as hum or buzz signatures associated with a failed or failing power supply, and/or noises associated with other components. In aspects, recognition file 106 can store a spectral profile for failure events or other conditions, and other associated data. In embodiments, recognition file 106 can be downloaded or updated from an external database or other source. Monitoring tool 120 can be configured to determine that an event or condition reflected in acoustic data 118 matches a fault profile in recognition file 106 based on a complete or partial match, for example, a spectral composition that matches a predetermined event by a threshold of at least 80 percent, or based on other thresholds or criteria. In aspects, other acoustic properties or signatures can be detected, such as an increase or decrease in ambient sound volume over a defined period of time, or other sound characteristics. Other detection or recognition techniques or criteria can be sued.

Figure 2:
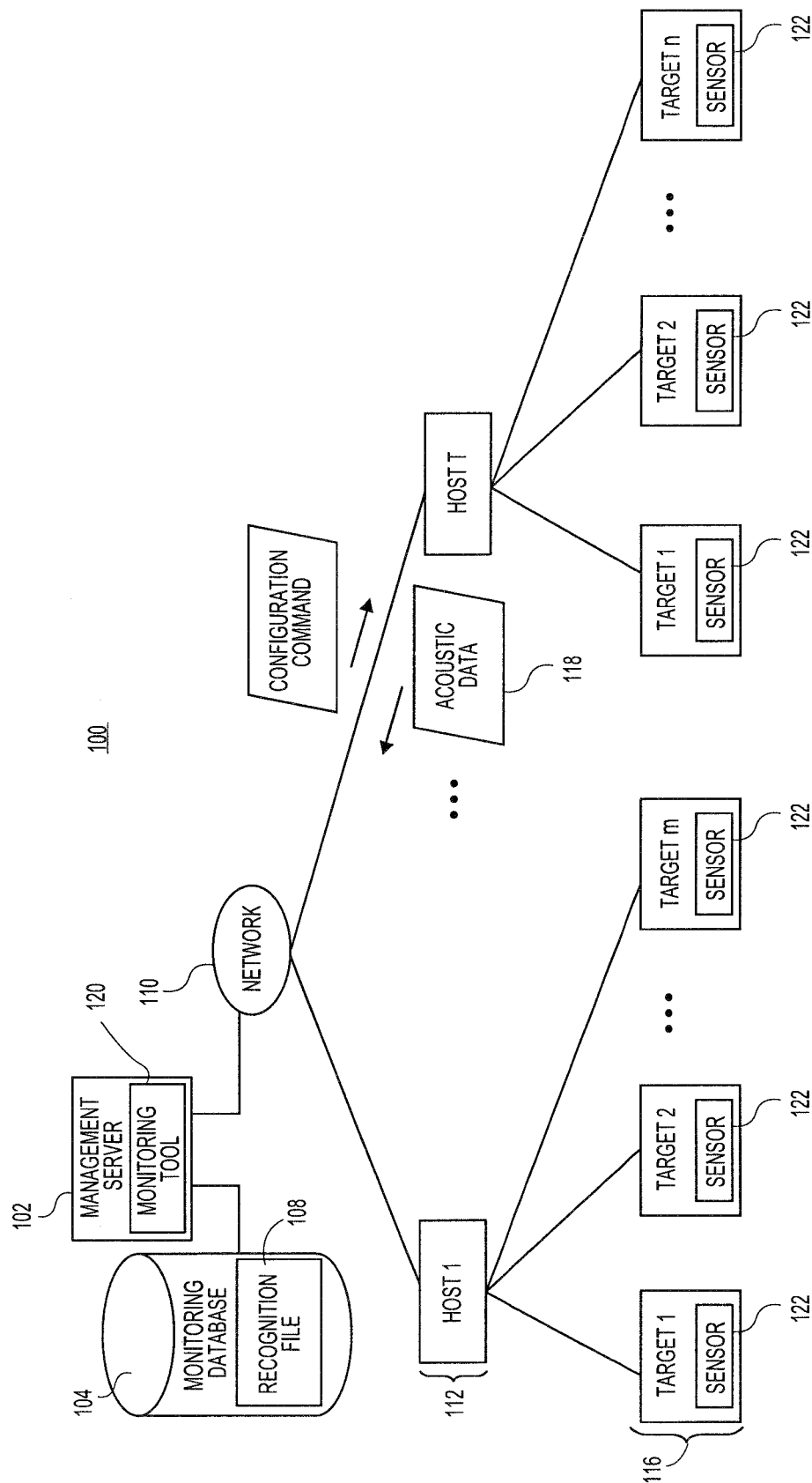
FIG. 2 illustrates an overall network in which systems and methods for detecting machine faults in network using acoustic monitoring can implemented, according to various embodiments in further regards.

As shown for instance in FIG. 2, after receipt of acoustic data 118 and performing an event identification analysis on that data to detect one or more potential or actual faults, failures, and/or other conditions, monitoring tool 120 and/or management server 102 can respond by issuing one or more configuration command 106 to a machine that is associated with the acoustically detected event. For instance, if the acoustically detected event relates to a hard drive malfunction or failure, configuration command 106 can be or include one or more instructions to power down, park, place into sleep mode, and/or otherwise de-activate a hard disk that is identified as being in potential or actual failure. Other configurations, commands, instructions, and/or other responses based on detected acoustic events can be used.

Figure 3:
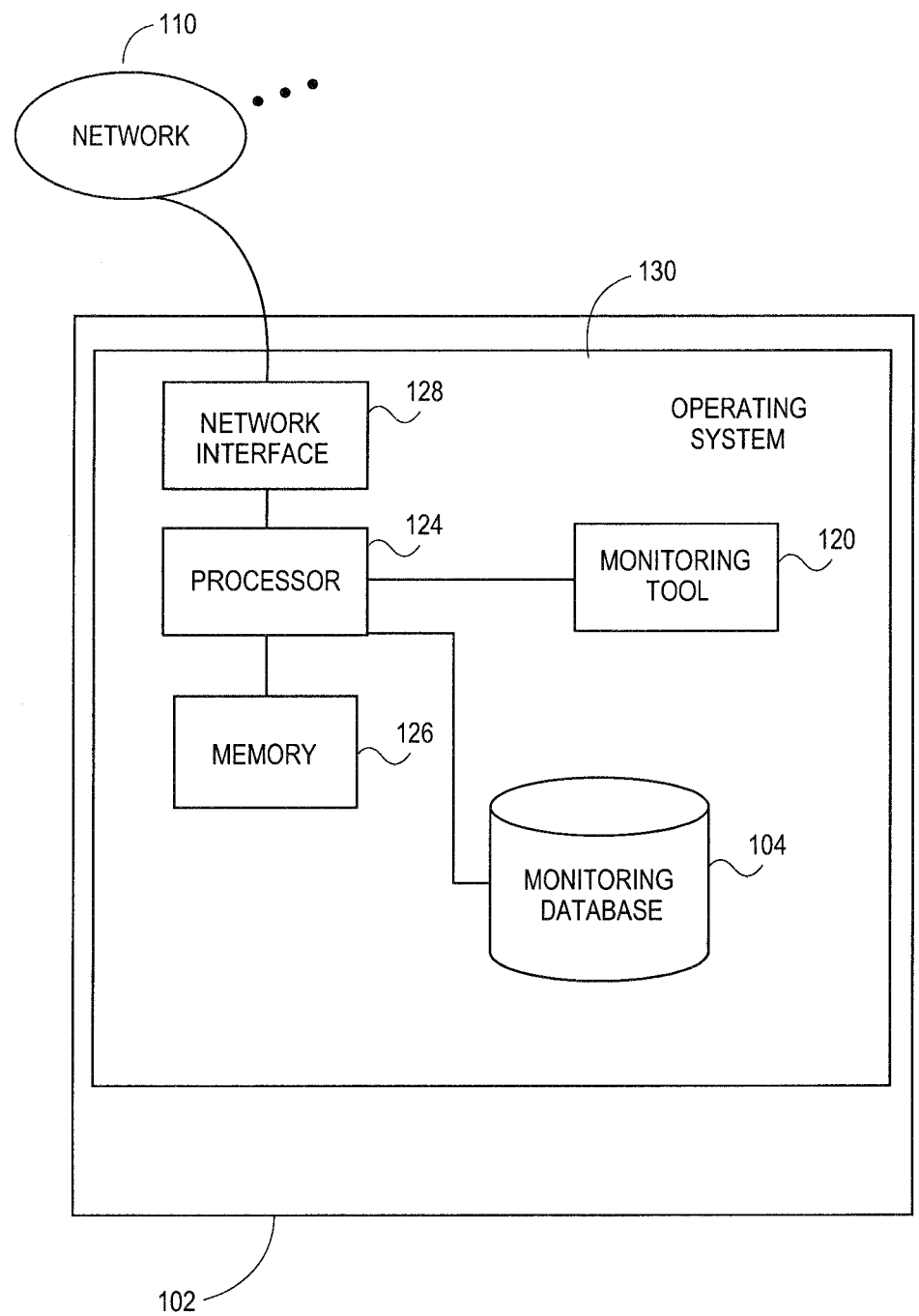
FIG. 3 illustrates an exemplary hardware configuration of a management server and associated resources, according to various embodiments.

FIG. 3 illustrates an exemplary diagram of hardware and other resources that can be incorporated in a management server 102 configured to communicate with managed network 110 including set of target machines 116, set of hosts 112, and/or other resources, according to embodiments. In embodiments as shown, the management server 102 can comprise a processor 124 communicating with memory 126, such as electronic random access memory, operating under control of or in conjunction with operating system 130. Operating system 130 can be, for example, a distribution of the Linux™ operating system, the Unix™ operating system, or other open-source or proprietary operating system or platform. Processor 124 also communicates with a monitoring database 104, such as a database stored on a local hard drive. Processor 124 further communicates with network interface 128, such as an Ethernet or wireless data connection, which in turn communicates with one or more managed network 110, which can be, include, or be accessed with via private or secure channels, and/or the Internet or other public or private networks. Processor 124 also communicates with monitoring tool 120 and/or other resources or logic, to execute acoustic monitoring, control, messaging, and other management processes described herein. Other configurations of the management server 102, associated network connections, and other hardware and software resources are possible. While FIG. 3 illustrates management server 102 as a standalone system comprises a combination of hardware and software, management server 102 can also be implemented as a software application or program capable of being executed by a conventional computer platform. Likewise, management server 102 can also be implemented as a software module or program module capable of being incorporated in other software applications and programs. In either case, management server 102 can be implemented in any type of conventional proprietary or open-source computer language.

Figure 4:
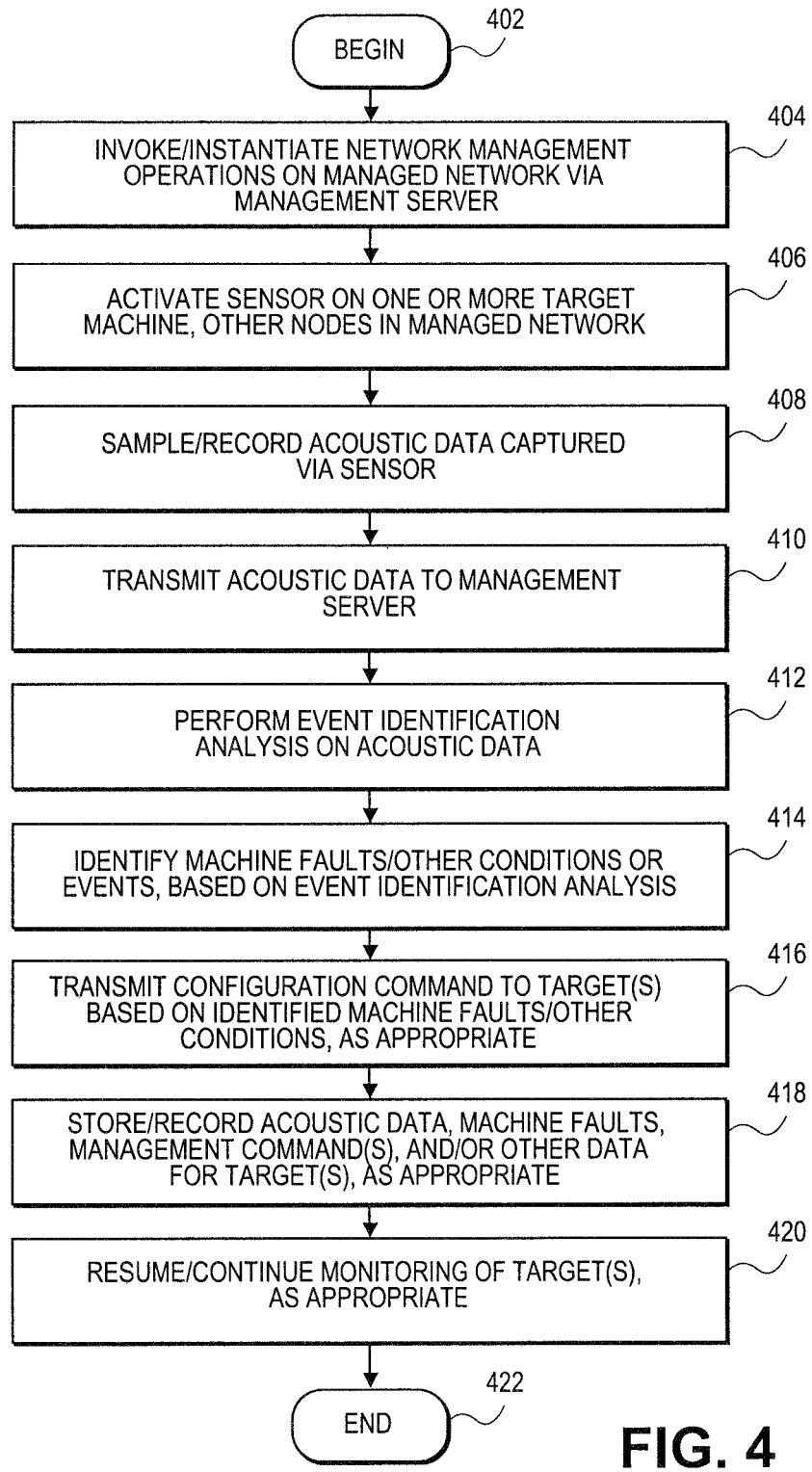
FIG. 4 illustrates a flowchart of monitoring processing that can be used in systems and methods for detecting machine faults in network using acoustic monitoring, according to various embodiments.

FIG. 4 illustrates a flowchart of overall processing that can be used in systems and methods for detecting machine faults in network using acoustic monitoring, according to various embodiments. In 402, processing can begin. In 404, network management operations can be invoked or instantiated on managed network 110 via management server 102, for instance by user selection or initiation. In 406, one or more sensor 122 can be activated on one or more targets in set of targets 116 and/or other nodes or machines in managed network 110, such as servers or other hosts in set of hosts 112. In embodiments sensor 122 can be or include a microphone or other acoustic sensor. In embodiments each target or other machine can contain more than one sensor 122. In 408, ambient sound in the subject target(s) or other machines can be sampled and/or captured via sensor 122, such as for example via an analog-to-digital conversion (ADC) chip, digital signal processor (DSP), or other hardware or software, to generate acoustic data 118. In aspects, acoustic data 118 can be recorded to a hard drive or other storage in the target or other machine. In 410, acoustic data 118 can be transmitted to management server 102 and/or other local or remote management node. In embodiments, the transmission of acoustic data 118 can be via a wireless module in the target(s), such as a WiFi™ or Bluetooth™ transceiver. In 412, 120 can perform an event identification analysis on acoustic data 118, for instance, by comparing acoustic data 118 to signatures in recognition file 108. In embodiments, recognition file 108 can contain, for instance, the acoustic signatures of potential fault events or other conditions such as, for instance, a whining sound that can emanate from a damaged hard disk, a buzzing sound from a damaged power transformer, a thrashing sound from a hard disk that is excessively caching or searching its data, a low background sound that can indicate a power or motherboard failure, or other sounds or acoustic events. In embodiments, the signatures recorded in recognition file can be organized as spectral signatures obtained via fast Fourier or other analysis of sampled damaged disks, damaged power supplies, and so forth.

In 414, a machine fault and/or other condition in a sampled target or other node or machine can be identified based on the event identification analysis performed on acoustic data 118. For instance, a defective hard drive can be identified based on the acoustic signature analysis. In 416, management server 102 can transmit a configuration command 106 to the subject target(s) and/or other machines or nodes based on the identified fault and/or other condition. For instance, configuration command 106 can include instructions to power down the subject target(s), power down or park a suspected defective hard drive, and/or perform other actions based on the detected event or condition. In 418, acoustic data 118, any identified machine faults and/or other conditions, any management or configuration command 106, and/or other data related to the subject target(s) and/or other machines or nodes can be stored or recorded, for example, in monitoring database 104 or other local or remote storage. In 420, the acoustic monitoring of the subject target(s) and/or other machines or nodes can be continued or resumed. In 422, processing can repeat, return to a prior processing point, jump to a further processing point, or end.

The foregoing description is illustrative, and variations in configuration and implementation may occur to persons skilled in the art. For example, while embodiments have been described which operate in a network incorporating one management server 102 communicating with managed network 110, in embodiments, more than management server 102 or related hosts can be used. Likewise, while embodiments have been described in which each acoustically monitored machine contains one integrated or associated microphone or other sound sensor, in embodiments, multiple sound sensors can be integrated into monitored machines as desired. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
    receiving acoustic data from a machine in a managed network;
    performing a spectral analysis of the acoustic data;
    analyzing, by a processor, the spectral analysis in view of a plurality of event signatures stored in a recognition file, wherein each of the plurality of event signatures comprise a failure event and a plurality of conditions in the managed network, wherein the plurality of conditions comprise one of an increase or decrease in ambient sound in the managed network over a defined period;
    detecting, by the processor, the failure event and one of the plurality of conditions in one of the plurality of event signatures in view of the analyzing; and
    generating a configuration command to the machine in view of the detecting.

2. The method of claim 1, wherein the acoustic data comprises acoustic signals captured via acoustic sensor in the machine.

3. The method of claim 2, further comprising performing an analog to digital conversion of the acoustic signals to generate a digital representation of the acoustic signals.

4. The method of claim 3, further comprising performing the spectral analysis of the digital representation of the acoustic signals.

5. The method of claim 1, wherein the plurality of event signatures comprise one of an acoustic signature of a malfunctioning disk, an acoustic signature of a malfunctioning power supply, or an acoustic signature of a malfunction machine motherboard.

6. The method of claim 1, wherein the configuration command comprises at least a power control command.

7. The method of claim 1, wherein the acoustic data is transmitted in one of a continuous, periodic and irregular interval to the processor.

8. The method of claim 1, wherein the plurality of conditions comprise one of a whining sound from a damaged hard disk, a buzzing sound from a damaged power transformer, a thrashing sound from a hard disk excessively caching or searching data or a low background sound indicating a power or motherboard failure.

9. The method of claim 1, wherein the plurality of event signatures stored in the recognition file are organized as spectral signatures obtained via fast Fourier analysis of one of sampled damaged disks or damaged power supplies.

10. The method of claim 1, wherein the failure event is one of a potential failure event or an actual failure event.

11. The method of claim 10, wherein the configuration command comprise one of power down, park, place into sleep mode, or de-activate the machine that is identified as being in one of the potential or actual failure event.

12. A system, comprising:
    a memory;
    a processor coupled to the memory, wherein the processor is configured to:
        receive acoustic data captured from a machine;
        perform a spectral analysis of the acoustic data;
        analyze the spectral analysis in view of a plurality of event signatures stored in a recognition file, wherein each of the plurality of event signatures comprise a failure event and a plurality of conditions in the managed network, wherein the plurality of conditions comprise one of an increase or decrease in ambient sound in the managed network over a defined period;
        detect the failure event and one of the plurality of conditions in one of the plurality of event signatures in view of the analyzing; and
        generate a configuration command to the machine in view of the detecting.

13. The system of claim 12, wherein the acoustic data comprises acoustic signals captured via acoustic sensor in the machine.

14. The system of claim 13, wherein the acoustic signals comprise a digital representation of the acoustic signals.

15. The system of claim 14, wherein the processor is further configured to perform a the spectral analysis of the digital representation of the acoustic signals.

16. The system of claim 12, wherein the plurality of event signatures comprise one of an acoustic signature of a malfunctioning disk, an acoustic signature of a malfunctioning power supply, or an acoustic signature of a malfunction machine motherboard.

17. The system of claim 12, wherein the configuration command comprises at least a power control command.

18. The system of claim 12, wherein the processor is arranged to be instantiated from a cloud-based network.

19. The system of claim 12, wherein the plurality of conditions comprise one of a whining sound from a damaged hard disk, a buzzing sound from a damaged power transformer, a thrashing sound from a hard disk excessively caching or searching data or a low background sound indicating a power or motherboard failure.

20. The system of claim 12, wherein the plurality of event signatures stored in the recognition file are organized as spectral signatures obtained via fast Fourier analysis of one of sampled damaged disks or damaged power supplies.

21. The system of claim 12, wherein the failure event is one of a potential failure event or an actual failure event.

22. The system of claim 21, wherein the configuration command comprise one of power down, park, place into sleep mode, or de-activate the machine that is identified as being in one of the potential or actual failure event.

23. A non-transitory machine-readable storage medium including data that, when accessed by a processor, cause the processor to perform operations comprising:
receiving acoustic data from a machine in a managed network;
performing a spectral analysis of the acoustic data;
analyzing, by the processor, the spectral analysis in view of a plurality of event signatures stored in a recognition file, wherein each of the plurality of event signatures comprise a failure event and a plurality of conditions in the managed network, wherein the plurality of conditions comprise one of an increase or decrease in ambient sound in the managed network over a defined period;
detecting, by the processor, the failure event and one of the plurality of conditions in one of the plurality of event signatures in view of the analyzing; and
generating a configuration command to the machine in view of the detecting.

24. The non-transitory machine-readable storage medium of claim 23, wherein the acoustic data comprises acoustic signals captured via acoustic sensor in the machine.

25. The non-transitory machine-readable storage medium of claim 24 having further data therein, which accessed by the processor, cause the processor to perform a further set of operations, further comprising:
performing an analog to digital conversion of the acoustic signals to generate a digital representation of the acoustic signals.

26. The non-transitory machine-readable storage medium of claim 25 having further data therein, which accessed by the processor, cause the processor to perform a further set of operations, further comprising:
performing the spectral analysis of the digital representation of the acoustic signals.

27. The non-transitory machine-readable storage medium of claim 23, wherein the plurality of event signatures comprise one of an acoustic signature of a malfunctioning disk, an acoustic signature of a malfunctioning power supply, or an acoustic signature of a malfunction machine motherboard.

28. The non-transitory machine-readable storage medium of claim 23, wherein the configuration command comprises at least a power control command.

29. The non-transitory machine-readable storage medium of claim 23, wherein the acoustic data is transmitted in one of a continuous, periodic and irregular interval to the processor.

30. The non-transitory machine-readable storage medium of claim 23, wherein the plurality of conditions comprise one of a whining sound from a damaged hard disk, a buzzing sound from a damaged power transformer, a thrashing sound from a hard disk excessively caching or searching data or a low background sound indicating a power or motherboard failure.

31. The non-transitory machine-readable storage medium of claim 23, wherein the plurality of event signatures stored in the recognition file are organized as spectral signatures obtained via fast Fourier analysis of one of sampled damaged disks or damaged power supplies.

32. The non-transitory machine-readable storage medium of claim 23, wherein the failure event is one of a potential failure event or an actual failure event.

33. The non-transitory machine-readable storage medium of claim 32, wherein the configuration command comprise one of power down, park, place into sleep mode, or de-activate the machine that is identified as being in one of the potential or actual failure event.

* * * * *